United States Patent [19]
Fiesta

[11] Patent Number: 5,993,121
[45] Date of Patent: Nov. 30, 1999

[54] COOLING DEVICE FOR MULTI-AXIS ROTARY MACHINING TOOL

[75] Inventor: Ralph L. Fiesta, Federal Way, Wash.

[73] Assignee: The Boeing Company, Seattle, Wash.

[21] Appl. No.: 08/859,608

[22] Filed: May 20, 1997

[51] Int. Cl.⁶ .................................................. B23B 51/06
[52] U.S. Cl. .............................. 408/61; 408/56; 409/136
[58] Field of Search ................................ 408/56, 60, 61; 409/136

[56] References Cited

U.S. PATENT DOCUMENTS

| | | | |
|---|---|---|---|
| 3,868,195 | 2/1975 | Anderson et al. | 408/61 |
| 4,392,761 | 7/1983 | Eckle | 408/59 |
| 4,578,003 | 3/1986 | Eckle | 408/56 |
| 4,778,315 | 10/1988 | Duffy et al. | 409/136 |
| 4,798,505 | 1/1989 | Ameseder | 409/136 |
| 4,822,218 | 4/1989 | Satoh | 409/136 |
| 4,890,963 | 1/1990 | Keritsis | 408/59 |
| 4,929,130 | 5/1990 | Diebolt et al. | 409/136 |
| 5,779,402 | 7/1998 | Kameda | 409/136 |

*Primary Examiner*—Daniel W. Howell
*Assistant Examiner*—Monica Smith
*Attorney, Agent, or Firm*—Lawrence W. Nelson

[57] ABSTRACT

A cooling apparatus for cooling a tool rotated by a spindle of a machining device. The cooling apparatus includes a tube having a plurality of orifices. The tube is mounted onto a stationary housing about the spindle to substantially encircle an axis of the tool. The apparatus also includes a plurality of nozzles connected to a respective one of the orifices, each of the nozzles directing a discharge of fluid substantially toward the tool.

7 Claims, 3 Drawing Sheets

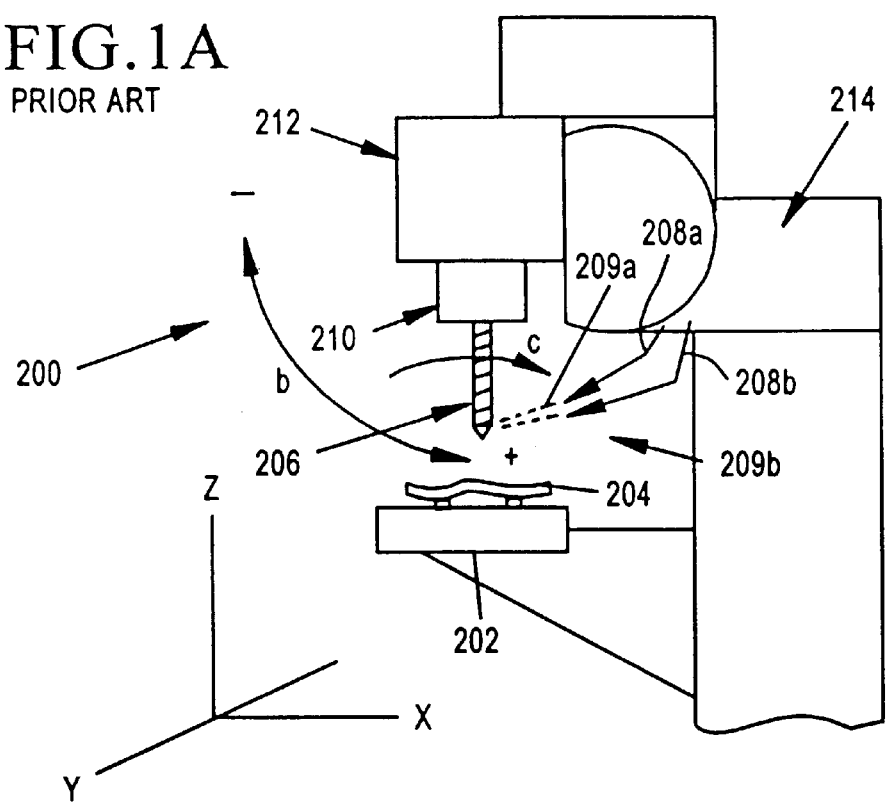
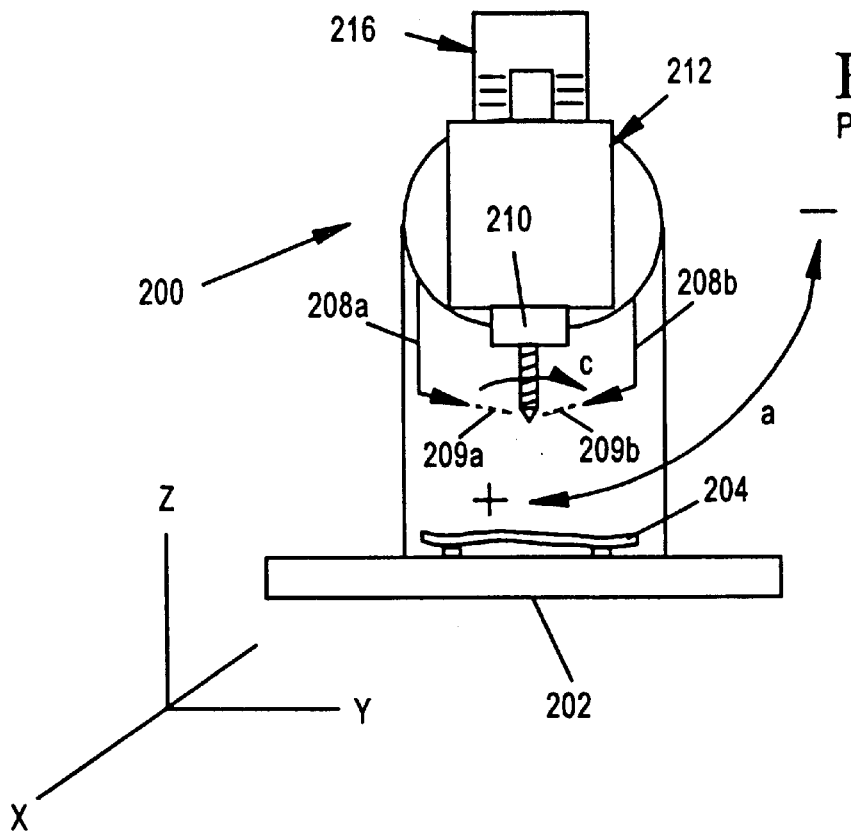

COOLING DEVICE FOR MULTI-AXIS ROTARY MACHINING TOOL

BACKGROUND OF THE INVENTION

1. Field of the Invention

The present invention relates to a cooling device, and more particularly to a cooling device for a multi-axis rotary machining tool.

2. Background Information

A coolant device for a rotary machining device 200 is shown in FIGS. 1A and 1B. The machining device 200 often includes a platform 202, to hold a component 204. The component 204 is acted upon by a machining tool 206 of the machining device 200. Two nozzles, a first nozzle 208A and a second nozzle 208B are used to spray streams 209A and 209B of cold fluid on the tool 206. The first and second nozzles 208A and 208B are indirectly mounted on an arm 214 of the machining device 200.

The machining device 200 also has a spindle 210, attached to an articulating head 212 capable of pivoting about a "B" axis, as shown in FIG. 1A, as well as an "A" and "C" axis, as shown in FIG. 1B. The machining device 200 moves the spindle 210 along the X-axis and Y-axis utilizing the movement of the arm 214 which travels along tracks (not shown). The arm 214 is also capable of moving the position of the spindle 210 along the Z-axis using vertical track 216, shown in FIG. 1B.

When the tool 206 begins to operate on the component 204, the jet streams 209A and 209B are discharged from each of the respective nozzles 208A and 208B. The jet streams of cold fluid keep the tool 206 from overheating which would cause it to prematurely deteriorate. In high speed machining applications, the deterioration can occur very rapidly, and it is vital that the tool 206 be kept cool. The fluid also lubricates the area of the component 204 being cut by the tool 206.

When the machining device 200 moves the tool 206 within the X, Y, Z plane, the nozzles 208A and 208B constantly provide the tool 206 with the streams 209A and 209B of the cooling fluid since the movement of the nozzles 208A and 208B coincide with the movement of the arm 214. However, when the machining device 200 moves the spindle 210 and tool 206 along the A-axis or B-axis, the jet streams 209A and 209B no longer contact the drill 206, and it is no longer cooled. Thus, the drill bit 206 begins to deteriorate when operating along the A-axis or B-axis unless the machining device 200 is stopped and the nozzles 208A and 208B are readjusted by hand.

Replacement tools, especially for high speed machining operations, can cost thousands of dollars. Further, without lubrication, the tool 206 may break off or damage the component 52. When the component 52 is a large aircraft member, the cost for replacements may be in the tens of thousands of dollars. Accordingly, failure to provide the cooling fluid along the A-axis and B-axis is a costly problem.

Another disadvantage of the machining device 200 is that chips left over from the machining operation get into the tracks and jam the machining device 200 so that it can no longer move along the X-axis or Y-axis. Further, the chips fly into a main bearing of the spindle 210, causing it to jam or significantly shorting its operational life.

Accordingly, there is a need for a cooling device that provides a constant source of cooling fluid to a machining device along any of 5 axes. Further, there is a need for a device that prevents the accumulation of machining chips, which can impede the movement of the machining device, and protect the spindle bearing from damage caused by flying chips.

SUMMARY OF THE INVENTION

In one aspect, the present invention relates to a cooling apparatus for cooling a tool rotated by a spindle of a machining device. The cooling apparatus includes a tube having a plurality of orifices. The tube is mounted onto a stationary housing about the spindle to substantially encircle an axis of the tool. The apparatus also includes a plurality of nozzles connected to a respective one of the orifices, each of the nozzles directing a discharge of fluid substantially toward the tool.

In another aspect, the present invention relates to a cooling apparatus for a numerically controlled high speed rotary machining device having a spindle for rotating a machining tool, and a stationary spindle housing. The machining device includes a blast ring coupled to the stationary spindle housing, the blast ring encompasses a base of the tool. The apparatus includes an annular tube having a closed end and an open end and having a plurality of threaded bushings, each bushing defining an orifice in the annular tube, the tabs extending inwardly from the tube, and coupled to the blast ring of the machining device. The apparatus also includes a flexible hose having a first end coupled to a fluid source and a second end connected to and in fluid communication with the open end of the annular tube. Further, the apparatus includes a plurality of nozzles, each nozzle threadly couples to a respective one of the plurality of bushings of the annular tube. The fluid from the fluid source passes through the flexible hose to the annular tube and out of each of the plurality of nozzles at a pressure ranging from 50 to 80 PSI, where at least one of the plurality of nozzles is directed at a tip of the tool.

In yet another aspect, the present invention relates to a multi-axis rotary machining device including an articulating head movable along five axes, a spindle having a stationary housing and a rotating member, the stationary housing being coupled to the articulating head, and a machine tool seated within the rotating member of the spindle, and rotating along with the rotating member. The device also includes an annular tube rigidly attached to the stationary housing of the spindle, the annular tube having an open end and a plurality of orifices, where a fluid enters the open end and exits the plurality of orifices. The device further includes a plurality of nozzles, each coupled to a respective one of the plurality of orifices, where the nozzles are positioned such that the fluid from the open end of the annular tube is directed to the machine tool.

BRIEF DESCRIPTION OF THE DRAWING

These and other features, aspects, and advantages of the present invention will become better understood with regard to the following description, appended claims, and accompanying drawings where:

FIG. 1A shows a side view of a prior art machining device;

FIG. 1B shows a front view of the prior art machining device;

DESCRIPTION OF A PREFERRED EMBODIMENT

Figure 2B:
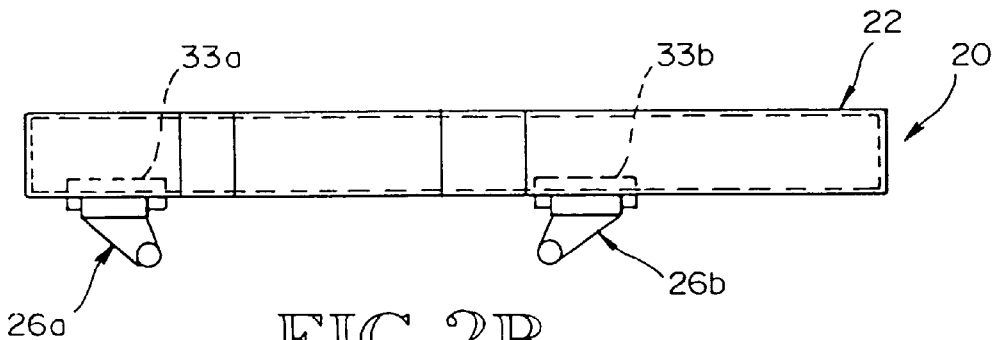
FIG. 2B shows a side view of the cooling device.
Figure 2A:
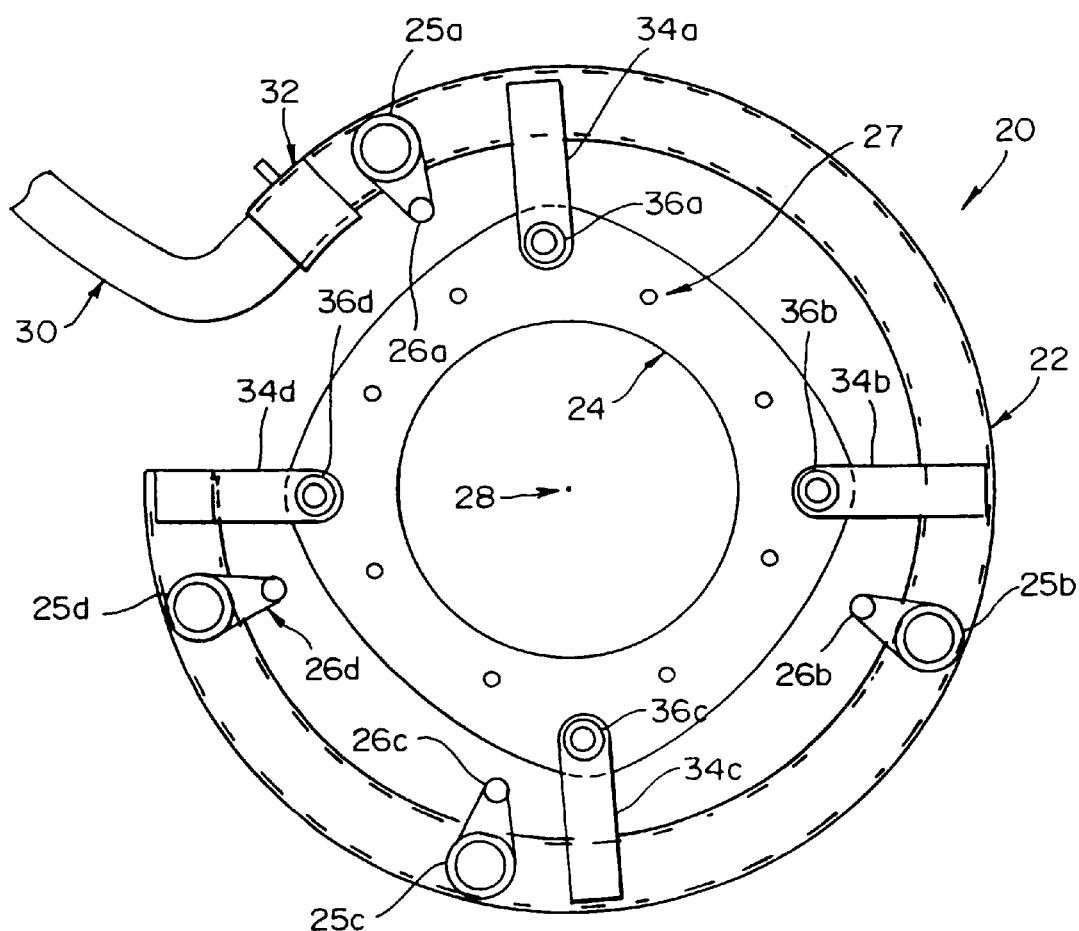
FIG. 2A shows a bottom view of a cooling device as an embodiment of the present invention.
Figure 3:
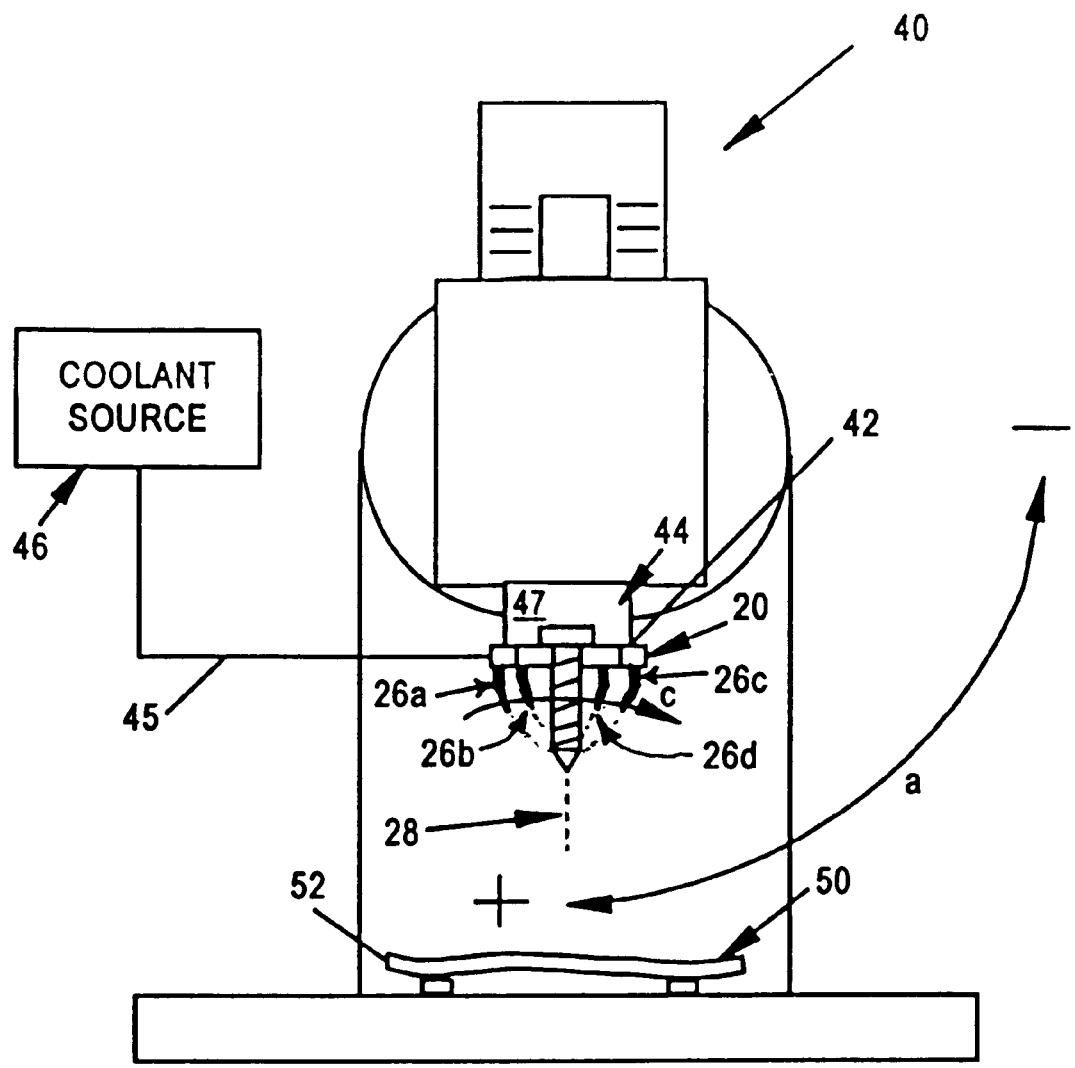
FIG. 3 shows a front view of the cooling device installed on a multi-axes machining device.

As shown in FIGS. 2A and 3, a cooling device 20 for a multi-axes machining device 40 includes a coolant ring 22, which ensures a constant supply of coolant to a cutting tool 48 of the machining device 40, even when the machining device 40 changes direction and moves along an A-axis or B-axis of the device.

As shown in FIG. 2A, the coolant ring 22 includes a first orifice 25A and attached nozzle 26A, a second orifice 25B and attached nozzle 26B, a third orifice 25C and attached nozzle 26C, and a fourth orifice 25D and attached nozzle 26D. The nozzles 26A–26D are directed along a machine axis 28 where the tool 48 of the machining device 40 meets a component 52 being machined. Water or any fluid coolant, such as Cinstar™, is supplied to the coolant ring 22 through a flexible hose 30, which is fastened to the ring 22 by a standard hose clamp 32.

In a preferred embodiment, the coolant ring 22 is formed from a one inch square tube, where each of the orifices 25A–D have a diameter of ¼ inch. A ¼ inch threaded bushing is welded into each of the orifices 25A, 25B, 25C, and 25D. The bushings 33 each receive the adjustable nozzles 26A–D. As shown in FIG. 2b, bushing 33a and 33b receive nozzles 26a and 26b, respectively. Preferably, the nozzles 26A–D are two piece loc-line nozzles, such as P/N 41401 (a plastic adjustable nozzle), and P/N 41406 (a plastic threaded member), into which the nozzle snaps and which threads into the threaded bushing.

The coolant ring 22 is fastened to a blast ring 24 via a first tab 34A, a second tab 34B, a third tab 34C and a fourth tab 34D, using four fasteners 36 A–D, such as an alien bolt. The blast ring 24 covers a spindle bearing 42, which is the rotating member of the spindle 44 of the multi-axis machining device 40, and prevents chips from flying into the spindle. The blast ring 24 is fixed to a stationary housing 47 of the spindle 44 using a bolt type fastener through holes 27 in the blast ring 24, and is rigidly attached to the machining device 40, as shown in FIG. 3.

The flexible hose 30 is connected to a coolant source 46 via a tube 45. The coolant flows into the ring 22 and through first through fourth nozzles 26A–26D, respectively. The first through fourth nozzles 26A–26D are then aligned so that the coolant they discharge contacts the machining tool 48 positioned along the machine axis 28.

Preferably, two of the nozzles 26A–26D are adjusted to spray directly on the tip of the machining tool 48 where it makes contact with the component 52. The remaining two nozzles are directed to fall a short distance away from the tip so the streams they discharge contact surface 50 of the component 52 before the tool 48 and clear away any debris on the surface 50. These streams also act to clear away any debris created by the tool 48 once it makes contact with the surface 50. The pressure of the coolant applied through the nozzles ranges from 60 PSI to 70 PSI and delivers up to 40 gallons per minute of coolant flow. Thus, the coolant under pressure not only cools and lubricates the machining tool 48 and the component 52, but also washes away chips from the surface 50 being machined.

The cooling device 20 can extend tool life by as much as 100%. Further, the cooling device 20 reduces stress on the spindle 42 and other systems of the machining device 40. Also, there is less chatter and better part finish when the device 20 is used. Another advantage of the cooling device 20 is that it reduces contamination to tracks, axis ways and bearings of the machining device 40. The cooling device 20 is also versatile and can be adapted to any machining tool having spindles attached to a rotary axis.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only by the following claims.

What is claimed is:

1. An apparatus for cooling, lubricating, and removing shavings from a tool rotated about an axis by a spindle within a stationary housing of a machining device, said cooling apparatus comprising:

an annular shaped tube having a plurality of orifices, said tube being mounted onto said stationary housing about said spindle to substantially encircle the axis of said tool; and a plurality of nozzles, each of said nozzles connected to a respective one of said orifices, and each of said nozzles directing a discharge of fluid substantially toward said tool, wherein at least one of the said plurality of nozzles is positioned to direct the fluid onto a tip of said tool, and wherein at least one of said plurality of nozzles is positioned to direct the fluid in front of the tip of said tool to clean away the shavings created during machining;

a flexible hose connected to one of said plurality of orifices of said tube, and in fluid communication with each of said nozzles; and fluid source for providing fluid that passes through said flexible hose to said tube and out of each of said plurality of nozzles as a stream under a pressure between 50 and 70 PSI and at a flow rate of approximately 40 gallons/minute.

2. The cooling apparatus according to claim 1 wherein said tube includes a plurality of tabs, each fastened onto said stationary housing about said spindle.

3. The cooling apparatus according to claim 1 wherein each of said plurality of orifices is defined by a threaded bushing, and wherein each of said plurality of nozzles is threadly engaged to said threaded bushing of said respective one of said orifices it encloses.

4. The cooling apparatus according to claim 1 wherein said tube includes a plurality of tabs each fastened to a blast ring which is coupled to said stationary housing about said spindle.

5. The cooling apparatus according to claim 1 wherein said machining device is a high speed rotary numerically controlled machining device.

6. A multi-axis rotary machining device comprising:

an articulating head movable along five axes;

a spindle having a stationary housing and a rotating member, said stationary housing being coupled to said articulating head;

a machine tool seated within said rotating member of said spindle, and rotating along with said rotating member;

an annular tube rigidly attached to said stationary housing of said spindle, said annular tube having an open end and a plurality of orifices, wherein a fluid enters said open end and exits said plurality of orifices; and a plurality of nozzles, each coupled to a respective one of said plurality of orifices, wherein said nozzles are positioned such that the fluid from said open end of said annular tube is directed to said machine tool, wherein at least one of the plurality of nozzles is positioned to direct the fluid onto a tip of said machine tool, and at least one of the plurality of nozzles is positioned to direct the fluid in front of the tip of said machine tool at a pressure of between 50 and 70 PSI to clean away shavings created during the machining.

7. An apparatus for removal of shavings generated by a tool, which is rotated about an axis by a spindle positioned within a stationary housing of a machining device, and for cooling and lubricating the tool, the tool defining a center axis, said apparatus comprising:

an annular shaped tube mounted onto said stationary housing within which a fluid is passed;

at least one low-profile nozzle coupled to said tube and positioned such that the fluid from said tube is directed onto a tip of said tool for the cooling and lubrication of the tool; and at least one low-profile nozzle coupled to said tube and positioned such that the fluid from said tube is directed in front of the tip of said tool for the removal of the shavings generated by said tool.

* * * * *